US007509130B2

(12) United States Patent
Lee et al.

(10) Patent No.: US 7,509,130 B2
(45) Date of Patent: Mar. 24, 2009

(54) METHOD FOR LOCKING AND RELEASING A CAMERA IN A PORTABLE TERMINAL

(75) Inventors: Moon-Heui Lee, Gumi-si (KR); Jeon-Man Park, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 717 days.

(21) Appl. No.: 10/786,405

(22) Filed: Feb. 26, 2004

(65) Prior Publication Data

US 2004/0181678 A1 Sep. 16, 2004

(30) Foreign Application Priority Data

Feb. 28, 2003 (KR) ...................... 10-2003-0012779

(51) Int. Cl.
*H04Q 7/20* (2006.01)
*H04N 5/232* (2006.01)
(52) U.S. Cl. ................................. 455/456.1; 348/211.8
(58) Field of Classification Search .................. 395/56; 396/56–59; 348/211.99–211.14; 455/456.1, 455/456.3
See application file for complete search history.

(56) References Cited

U.S. PATENT DOCUMENTS

| 6,496,703 | B1 * | 12/2002 | da Silva ................. 455/456.4 |
| 6,738,572 | B2 * | 5/2004 | Hunter ....................... 396/56 |
| 6,982,747 | B2 * | 1/2006 | Yamagishi .............. 348/211.1 |
| 7,039,426 | B2 * | 5/2006 | Naiki ....................... 455/456.4 |
| 7,079,656 | B1 * | 7/2006 | Menzel et al. .............. 380/283 |
| 7,340,214 | B1 * | 3/2008 | Hamberg ................. 455/41.2 |
| 2002/0065070 | A1 | 5/2002 | Naiki ....................... 455/419 |
| 2002/0090929 | A1 | 7/2002 | Cho ......................... 455/410 |
| 2002/0090953 | A1 * | 7/2002 | Aburai et al. .............. 455/456 |
| 2002/0106202 | A1 * | 8/2002 | Hunter ........................ 396/56 |
| 2003/0008662 | A1 * | 1/2003 | Stern et al. ................. 455/456 |
| 2003/0039360 | A1 | 2/2003 | Younis ..................... 380/270 |
| 2003/0151669 | A1 * | 8/2003 | Robins et al. .......... 348/207.99 |
| 2004/0147255 | A1 * | 7/2004 | Lee ....................... 455/422.1 |

FOREIGN PATENT DOCUMENTS

| CN | 1391420 A | 1/2003 |
| JP | 2000-152217 | 5/2000 |

OTHER PUBLICATIONS

Industry and Economy Northern Economic Times/ Jan. 8, 2003/p. four; "Consumption Innovation" upgrades Haier's competitive power; Zhou Yuan; pp. 2.

* cited by examiner

*Primary Examiner*—Christian LaForgia
(74) *Attorney, Agent, or Firm*—Roylance, Abrams, Berdo & Goodman, L.L.P.

(57) ABSTRACT

Disclosed is a method for locking a camera in a portable terminal by means of a cipher apparatus connected to the portable terminal. The portable terminal includes the camera for photographing an image, a memory for storing secret codes, an image processor for processing the photographed image, and a display unit for displaying the processed image. The method comprises the steps of the cipher apparatus receiving information of the portable terminal, establishing a secret code, and transmitting enciphered data; the portable terminal receiving the enciphered data and stopping an operation of the camera; and the cipher apparatus receiving information reporting a locked state of the camera, and storing and displaying the secret code and a telephone number of the portable terminal.

5 Claims, 8 Drawing Sheets (a)

(b)

(c)

(d)

(e)

(f)

(g)

(h)

(i)

METHOD FOR LOCKING AND RELEASING A CAMERA IN A PORTABLE TERMINAL

PRIORITY

This application claims priority to an application entitled "Method For Locking And Releasing Camera In Portable Terminal Having The Camera" filed in the Korean Industrial Property Office on Feb. 28, 2003 and assigned Serial No. 2003-12779, the contents of which are incorporated herein by reference.

BACKGROUND OF THE INVENTION

1. Field of the Invention

The present invention relates to a portable terminal having a camera, and more particularly to a method for locking and releasing a camera in a portable terminal to prevent a user from using the camera in a predetermined area.

2. Description of the Related Art

Recently, portable terminals, such as mobile phones and notebooks, have become equipped with a camera, to provide a greater variety of services for users. However, the request for security for technology is increasing daily, and the advent of a portable terminal equipped with a camera increases the danger that data requiring security may be compromised. That is, data requiring security, such as technological data, documents, equipment, etc., of a company, may be photographed by a portable terminal equipped with a camera, and the information may be divulged without permission.

SUMMARY OF THE INVENTION

Accordingly, the present invention has been made to solve the above-mentioned problems occurring in the prior art, and an object of the present invention is to provide a method for locking and releasing a camera in a portable terminal, to prevent a user from using the camera in a predetermined area.

In order to accomplish this object, there is provided a method for locking a camera in a portable terminal by means of a cipher apparatus connected to the portable terminal. The portable terminal includes the camera for photographing an image, a memory for storing secret codes, an image processor for processing the photographed image, and a display unit for displaying the processed image. The method comprises the steps of receiving information of the portable terminal, establishing a secret code, and transmitting enciphered data; receiving the enciphered data and stopping an operation of the camera; and the receiving information reporting a locked state of the camera, and storing and displaying the secret code and a number of the portable terminal.

In accordance with another aspect of the present invention, there is provided a method for releasing a locked state of a camera in a portable terminal by means of a cipher apparatus connected to the portable terminal, the portable terminal includes the camera for photographing an image, a memory for storing secret codes, an image processor for processing the photographed image, and a display unit for displaying the processed image. The method comprises receiving information of the portable terminal, and obtaining a secret code for the locked state of the camera from a database for the portable terminal; transmitting enciphered data obtained from the secret code; receiving and deciphering the enciphered data, and comparing the secret code received from the cipher apparatus with one of the secret codes stored in the memory; and enabling the camera to operate when the secret code matches with said one of the secret codes stored in the memory as a result of the comparison.

In accordance with still another aspect of the present invention, there is provided a method for preventing a camera of a portable phone located in a cell of a base station from being operated. The method comprising transmitting a camera locking signal to the portable terminal located in the cell of the base station to prevent the camera from being used; and receiving the camera locking signal and controlling the camera so that the camera cannot operate.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Embodiments of the present invention will be described with reference to the accompanying drawings. In the following description, a detailed description of known functions and configurations incorporated herein will be omitted for conciseness.

Further, the following description will be given based on three embodiments of the present invention. The first embodiment of the present invention employs an example in which a camera is locked and released by a user interface. The second embodiment of the present invention employs an example in which a camera is locked and released by a cipher apparatus. The third embodiment of the present invention employs an example in which a camera of a portable terminal located in a cell of a base station is locked and released. In the following description, the three examples will be described in detail.

Figure 1:
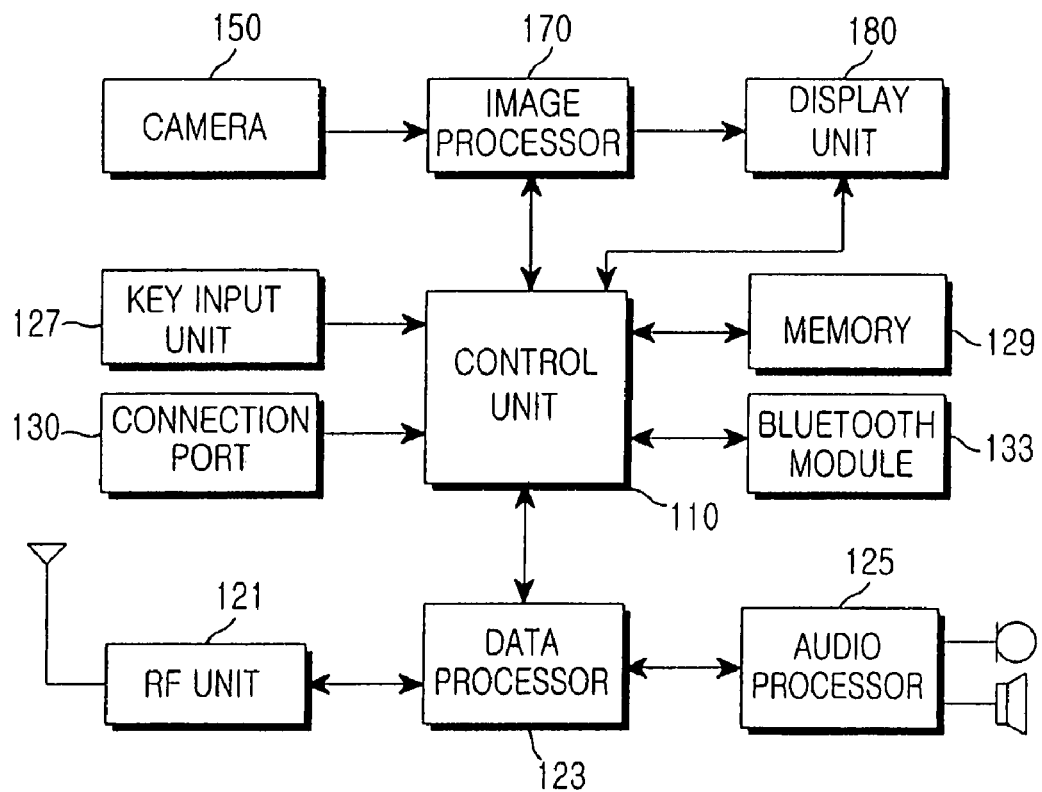
FIG. 1 is a block diagram illustrating an example of an internal construction of a portable terminal according to an embodiment of the present invention.

FIG. 1 is a block diagram illustrating an example of an internal construction of a portable terminal according to an embodiment of the present invention.

Referring to FIG. 1, an RF unit 121 performs transmission and reception functions for the portable terminal. The RF unit 121 includes an RF transmitter (not shown) for upward converting a frequency of a transmitted signal and amplifying the transmitted signal and an RF receiver (not shown) for low-noise amplifying a received signal and downward converting the frequency of the received signal. A data processor 123 includes a transmitter (not shown) for encoding and modulating the transmitted signal and a receiver (not shown) for demodulating and decoding the received signal. That is, the data processor 123 may include a MOdulator and DEModulater (MODEM) and a COder/DECoder (CODEC).

An audio processor 125 reproduces a received audio signal output from the data processor 123 or transfers a transmitted audio signal output from a microphone to the data processor 123. A key input unit 127 includes various function keys for input of various functions and keys for input of number and character information. The function keys according to the embodiment of the present invention may include a camera mode key, a camera locking mode key, a camera releasing mode key, a confirmation key, a cancel key, etc. The camera mode key places the portable terminal in the camera mode, the camera locking mode key locks the camera, and the camera releasing mode key releases the locked state of the camera. Description about the other functions keys will be provided when FIG. 2 is discussed.

A memory 129 may include a program memory section (not shown) and a data memory section (not shown). The program memory section stores programs for controlling the general operation of the portable terminal. The data memory section temporarily stores data generated in the course of executing the programs, and stores secret codes, etc. A camera 150 photographs image data and has an image sensor for converting an optical signal to an electric signal. The camera sensor may be a Charge Coupled Device (CCD) sensor.

A control unit 110 controls the general operation of the portable terminal. Further, the data processor 123 may belong to the control unit 110. The control unit 110 enables the memory 129 to store a secret code and prevents an image processor 170 from processing the image photographed by the camera 150. Further, the control unit 110 enables a communication with a cipher apparatus through a connection port 130 and a BLUETOOTH module 133. The image processor 170 generates image data for displaying an image of the image signal input from the camera 150. The image processor 170 transmits the image signal received under the control of the control unit 110 corresponding to the screen standard of a display unit 180, and compresses or decompresses the image data. The display unit 180 may employ a Liquid Crystal Display (LCD), etc., and receives the image data from the image processor 170 and displays the image data on a screen. The connection port 130 is connected to the cipher apparatus, which will be described later, and is necessary for interfacing the cipher apparatus and the portable terminal. The BLUETOOTH module 133 enables communication with the cipher apparatus to lock or release the camera.

Figure 2:
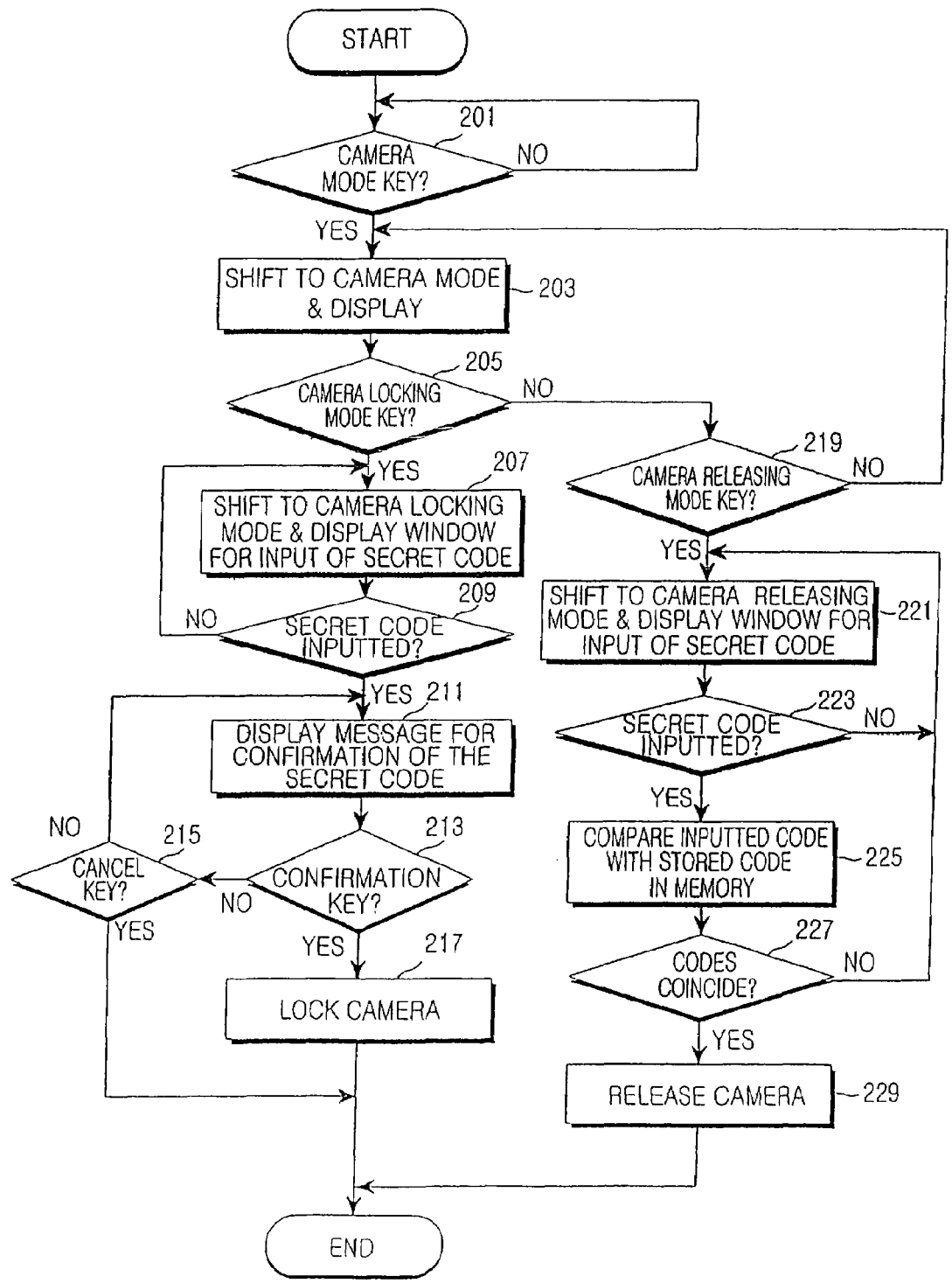
FIG. 2 is a flowchart illustrating an example of a method for locking and releasing a camera in a portable terminal according to a first embodiment of the present invention.
Figure 3:
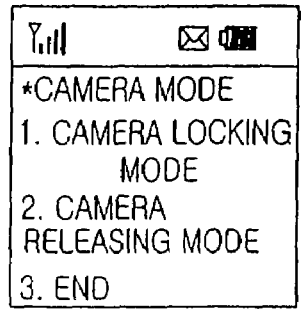
FIGS. 3A through 3I are diagrams illustrating examples of information displayed on a screen of a display unit in a portable terminal according to an embodiment of the present invention.
Figure 3:
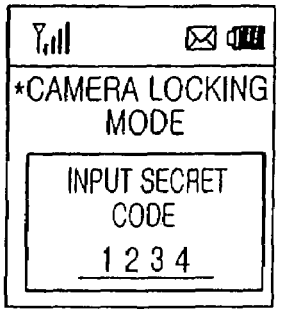
Figure 3:
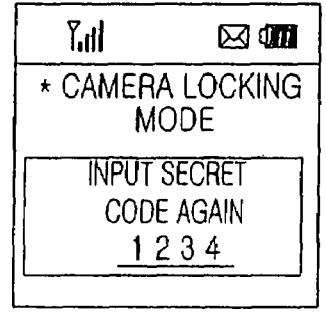
Figure 3:
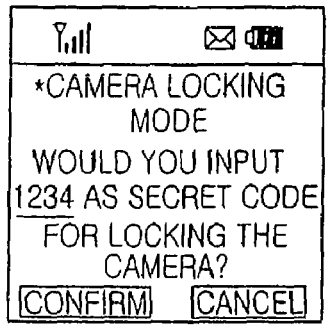
Figure 3:
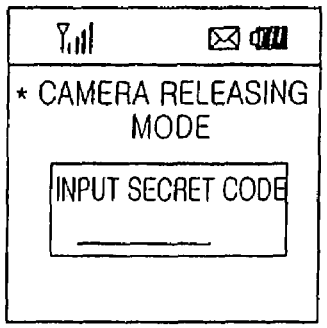
Figure 3:
Figure 3:
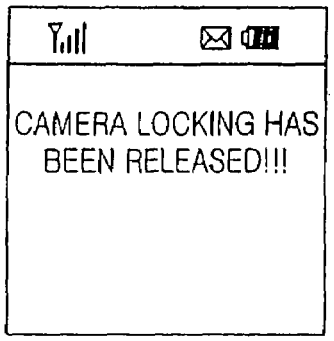
Figure 3:
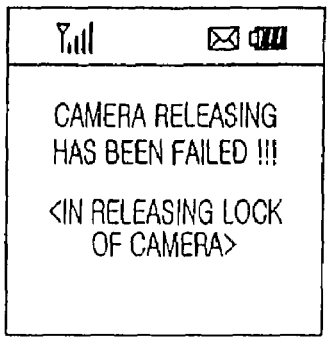
Figure 3:
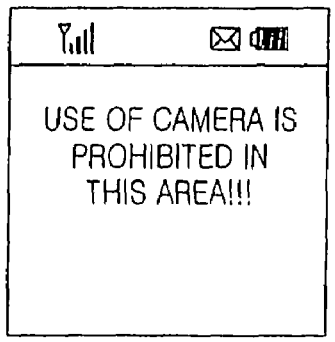

FIG. 2 is a flowchart illustrating an example of a method for locking and releasing a camera in a portable terminal according to a first embodiment of the present invention. FIGS. 3A through 3I are diagrams illustrating examples of information displayed on a screen of a display unit in the portable terminal according to an embodiment of the present invention. Hereinafter, a method of locking and releasing a camera by a user interface will be described with reference to FIGS. 1, 2, and 3.

In step 201, the control unit 110 determines whether a camera mode key signal is input from the key input unit 127. As a result of the determination, the control unit 110 maintains the initial state when a camera mode key signal is not input and controls step 203 to progress when a camera mode key signal is input. In step 203, the control unit 110 enters into the camera mode and controls the display unit 180 to display a message, and then progresses to step 205. Here, the displayed message in step 203 may be as shown in FIG. 3A. The displayed message as shown in FIG. 3A provides an opportunity to select among the camera locking mode, the camera releasing mode, and an ending or termination of the camera mode.

In step 205, the control unit 110 determines whether a camera locking mode key signal is input from the key input unit 127. As a result of the determination, the control unit 110 progresses to step 219 when a camera locking mode key signal is not input and progresses to step 207 when a camera locking mode key signal is input. In step 207, the control unit 110 enters into the camera locking mode and controls the display unit 180 to display a window for input of a secret code, and then progresses to step 209. Here, the displayed message in step 207 may be as shown in FIG. 3B.

In step 209, the control unit 110 determines whether a secret code is input from the key input unit 127. As a result of the determination, the control unit 110 repeatedly executes step 207 when a secret code is not input and proceeds to step 211 when a secret code is input. The secret code may be required to be input twice. That is to say, input of the secret code may be required once in the window as shown in FIG. 3B and then repeated in the window as shown in FIG. 3C. When the initially input secret code and the re-input secret code do not match, the camera locking mode cannot be established. That is, the camera cannot be locked. When the secret codes match, the control unit 110 progresses to step 211.

It should be appreciated by those skilled in the art that although the secret code is represented by numerals, the invention can be modified to hide the secret code, e.g. represent the secret code by asterisks without departing from the scope of the present invention. In addition, the secret code can be represented by letters or other characters besides numerals.

In step 211, the control unit 110 controls the display unit 180 to display a message for confirmation of the secret code, and then progresses to step 213. Here, the message displayed by the display unit 180 in step 211 may be as shown in FIG. 3D. That is, when a user inputs a secret code of "1234" twice, the display unit 180 displays the message as shown in FIG. 3D.

In step 213, the control unit 110 determines whether a confirmation key signal is input from the key input unit 127. As a result of the determination, the control unit 110 progresses to step 215 when a confirmation key signal is not input and progresses to step 217 when a confirmation key signal is input. In step 215, the control unit 110 determines whether a cancel key signal is input from the key input unit 127. As a result of the determination, the control unit 110 returns to step 211 when a cancel key signal is not input and terminates the entire process when a cancel key signal is input.

In step 217, the control unit 110 locks the camera. In locking the camera, the control unit 110 controls the memory 129 to store the input secret code. Further, the control unit 110 prevents the image processor 170 from being operated and controls the display unit 180 to display a message, "camera is locked". The embodiment of the present invention stops the operation of the image processor 170 to prevent the camera from being used but has no relation to the inner operation of the image processor 170, a description of which will be omitted here.

In step 219, the control unit 110 determines whether a camera releasing mode key signal is input from the key input unit 127. As a result of the determination, the control unit 110 returns to step 203 when a camera releasing mode key signal is not input and proceeds to step 221 when a camera releasing mode key signal is input. In step 221, the control unit 110 enters into the camera releasing mode and controls the display unit 180 to display a window for input of a secret code, and then proceeds to step 223. Here, the displayed message in step 221 may be as shown in FIG. 3E.

In step 223, the control unit 110 determines whether a secret code is input from the key input unit 127. As a result of the determination, the control unit 110 returns to step 221 when a secret code is not input and proceeds to step 225 when a secret code is input. In step 225, the control unit 110 compares the secret code input in step 223 with the secret code stored in the memory 129 in the camera locking mode and proceeds to step 227.

Figure 4:
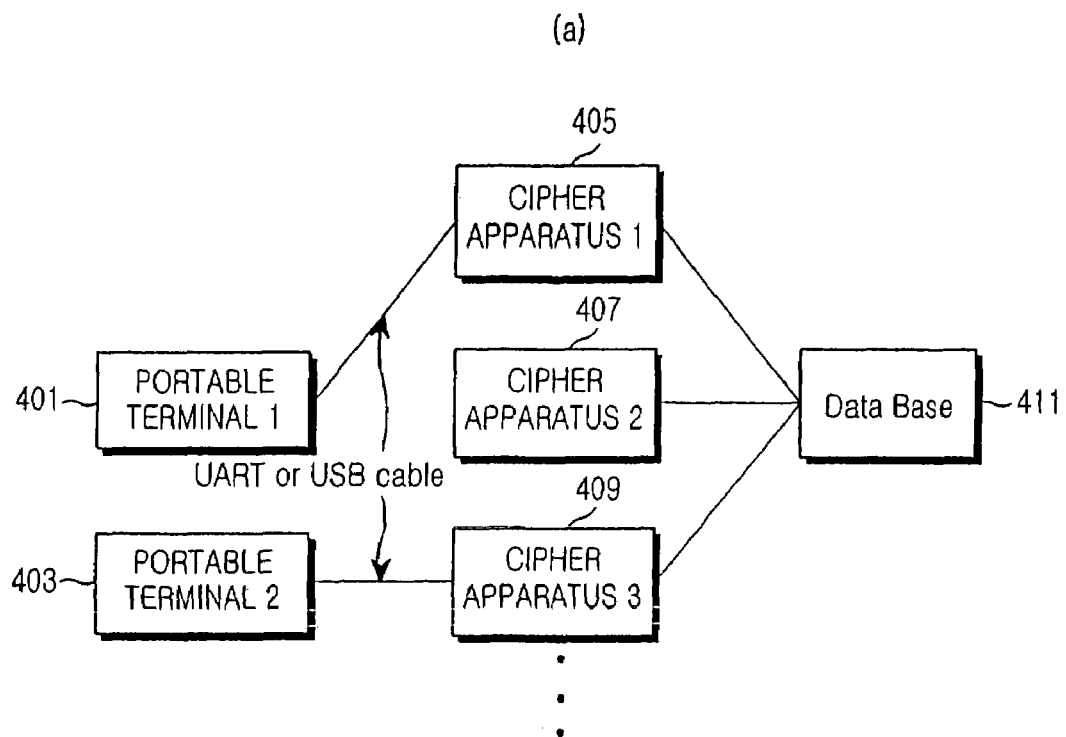
FIGS. 4A and 4B are block diagrams illustrating examples of portable terminals and cipher apparatuses connected through cables and wirelessly, respectively according to a second embodiment of the present invention.
Figure 4:
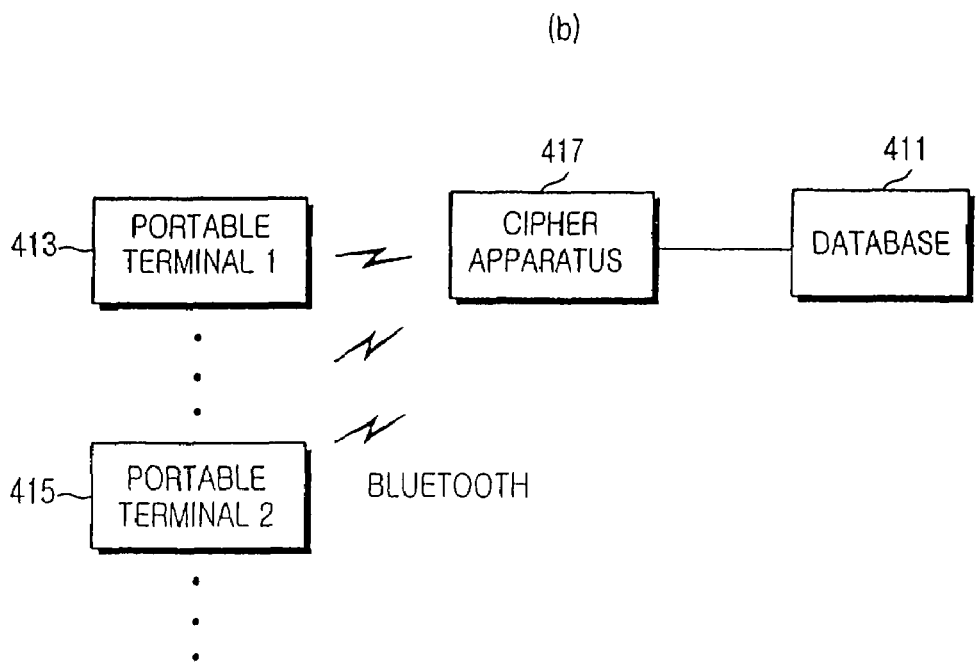

In step 227, the control unit 110 determines whether the secret codes match. As a result of the determination, the control unit 110 returns to step 221 when the secret codes do not match and proceeds to step 229 when the secret codes match. In step 229, the control unit 110 releases the locking state of the camera. In releasing the locking state of the camera, the control unit 110 enables the image processor 170 to be operated and deletes the secret code stored in the memory 129. Further, the control unit 110 controls the display unit 180 to display a message reporting the release of the locking state of the camera. Here, the message displayed by the display unit 180 in step 229 may be as shown in FIG. 3G FIGS. 4A and 4B are block diagrams illustrating examples of portable terminals and cipher apparatuses connected through cables or wirelessly, respectively according to a second embodiment of the present invention, which employ portable terminals and cipher apparatuses, connected through cables or by wireless, respectively.

Referring to FIG. 4A, each of first to third cipher apparatuses 405, 407 and 409 may be a terminal, such as a personal computer or a notebook, and may have a program for enciphering a secret code. The first to third cipher apparatuses 405, 407 and 409 may be independently used. Further, a plurality of portable terminals 401 and 403 may be connected with the first to third cipher apparatuses 405, 407 and 409 through Universal Asynchronous Receiver/Transmitter (UART) or Universal Serial Bus (USB) cables. The number of the cipher apparatuses 405, 407 and 409 may be increased or decreased according to the number of the portable terminals 401 and 403.

Hereinafter, a description will be given of an example in which the first cipher apparatus 405, the second cipher apparatus 407, and the third cipher apparatus 409 are used independently from each other. The cipher apparatuses 405, 407 and 409 are used in connection with a database 411. First, the case in which the cipher apparatuses are used independently from each other will be described. A user of the cipher apparatuses connects the first portable terminal 401 with the first cipher apparatus 405 to lock a camera of the first portable terminal 401 and connects the second portable terminal 403 with the third cipher apparatus 409 to lock a camera of the second portable terminal 403.

Once the cameras have been locked, the locking state of the first portable terminal 401 and the second portable terminal 403 can be released only by the first cipher apparatus 405 and the third cipher apparatus 409, respectively because the cipher apparatuses 405, 407 and 409 are used and operated independently from each other. Therefore, the first and third cipher apparatuses 405 and 409 employ a super key, which is capable of releasing the locking of the camera regardless of the secret code of the portable terminals 401 and 403. Therefore, the first and second portable terminals 401 and 403 can operate the camera only when they receive the super key from the cipher apparatuses 405 and 409, respectively.

Meanwhile, in a system as shown in FIG. 4B, in which a cipher apparatus 417 having a BLUETOOTH module and portable terminals 413 and 415 each having a BLUETOOTH module communicate with each other wirelessly instead of through UART or USB cables, users can establish locking of cameras of the portable terminals 413 and 415 by means of a wireless data exchange between the cipher apparatus 417 and the first and second portable terminals 413 and 415. Here, the cipher apparatus 417 may be a terminal, such as a personal computer or a notebook, and may have a program for enciphering a secret code. Further, the cipher apparatus 417 and the first and second portable terminals 413 and 415 perform a local area communication based on a BLUETOOTH standard. Since BLUETOOTH supports both a point-to-point connection and a point-to-multipoint connection, it is possible for one cipher apparatus 417 to encipher multiple cameras of multiple portable terminals including the first and second portable terminals 413 and 415.

Releasing the locking of a camera can be performed nearly in the same process as the process of locking the camera as described above. The difference between the two processes is that one cipher apparatus 417 having a BLUETOOTH module releases the locking of multiple cameras of the first and second portable terminals 413 and 415 via wireless communication.

It should be appreciated by those skilled in the art that although the cipher apparatus is shown as providing either a wireless or wire-based connection, the cipher apparatus can be modified to provide both a wireless and a wire-based connection without departing from the scope of the present invention.

Next, the method according to the second embodiment of the present invention, which utilizes cipher apparatuses connected to a database, will be described in more detail with reference to FIGS. 5 and 6.

Figure 5:
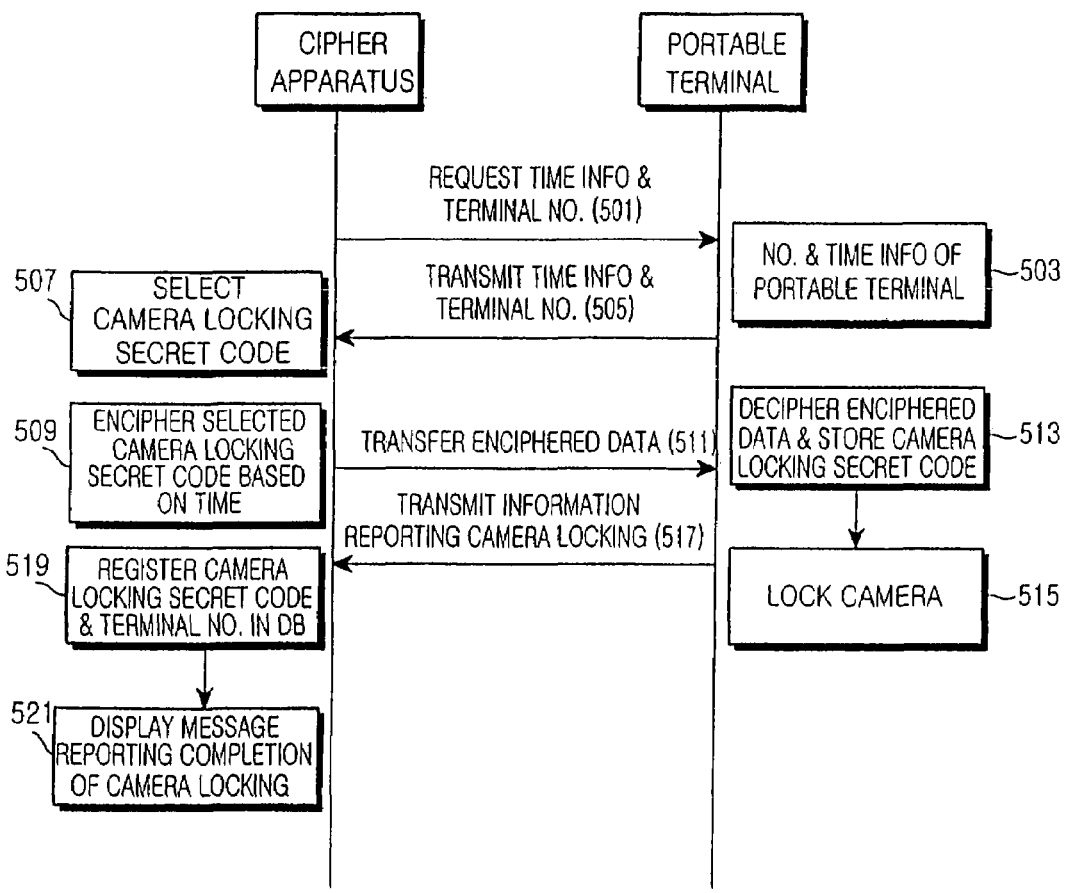
FIG. 5 is a flowchart illustrating an example of a process of locking a camera in a portable terminal connected with a cipher apparatus according to the second embodiment of the present invention.

FIG. 5 is a flowchart illustrating an example of a process of locking a camera in a portable terminal connected with a cipher apparatus according to the second embodiment of the present invention. With reference to FIGS. 1, 3, 4, and 5, a method for preventing a user from using a camera of a portable terminal will be described below. Further, it should be noted in the following description that the process of locking and releasing a camera of a portable terminal is performed through the cables or by wireless as described above.

When the cipher apparatus and the portable terminal are connected with each other through a USB cable, the cipher apparatus progresses to step 501. In step 501, the cipher apparatus requests time information and the portable terminal's phone number. The time information includes information of year, month, day, and time, stored in the portable terminal. In step 503, the control unit 110 reads its own number and time information from the memory 129. In step 505, the control unit 110 transmits the read number and time information to the cipher apparatus.

In step 507, the cipher apparatus receives the read number and time information of the portable terminal and randomly selects a camera locking secret code. In step 509, the cipher apparatus enciphers the randomly selected camera locking secret code. In enciphering the code, the cipher apparatus utilizes the time information received from the portable terminal. In other words, the cipher apparatus performs the enciphering on the basis of the time information, for example, the cipher apparatus may convert the time information into a binary number and then add or multiply the binary number to or by a predetermined parameter. In step 511, the cipher apparatus transfers the data enciphered based on time to the portable terminal. The enciphered data includes the camera locking secret code.

In step 513, the control unit 110 deciphers the enciphered data and stores the camera locking secret code in the memory 129. In step 515, the control unit 110 locks the camera. In locking the camera, the control unit 110 stops the image processor 170 and prevents the image processor 170 from being operated. Therefore, the display unit 180 cannot receive image data input from the image processor 170, and the memory 129 cannot store image data. In step 517, the control unit 110 transfers information reporting the execution of the locking of the camera to the cipher apparatus.

In step 519, the cipher apparatus, which has received the information reporting the execution of the locking of the camera, registers the camera locking secret code and the portable phone number in the database 411. In step 521, the cipher apparatus displays a message reporting completion of the locking of the camera. The completion of the locking of the camera may be displayed as shown in FIG. 3F.

Figure 6:
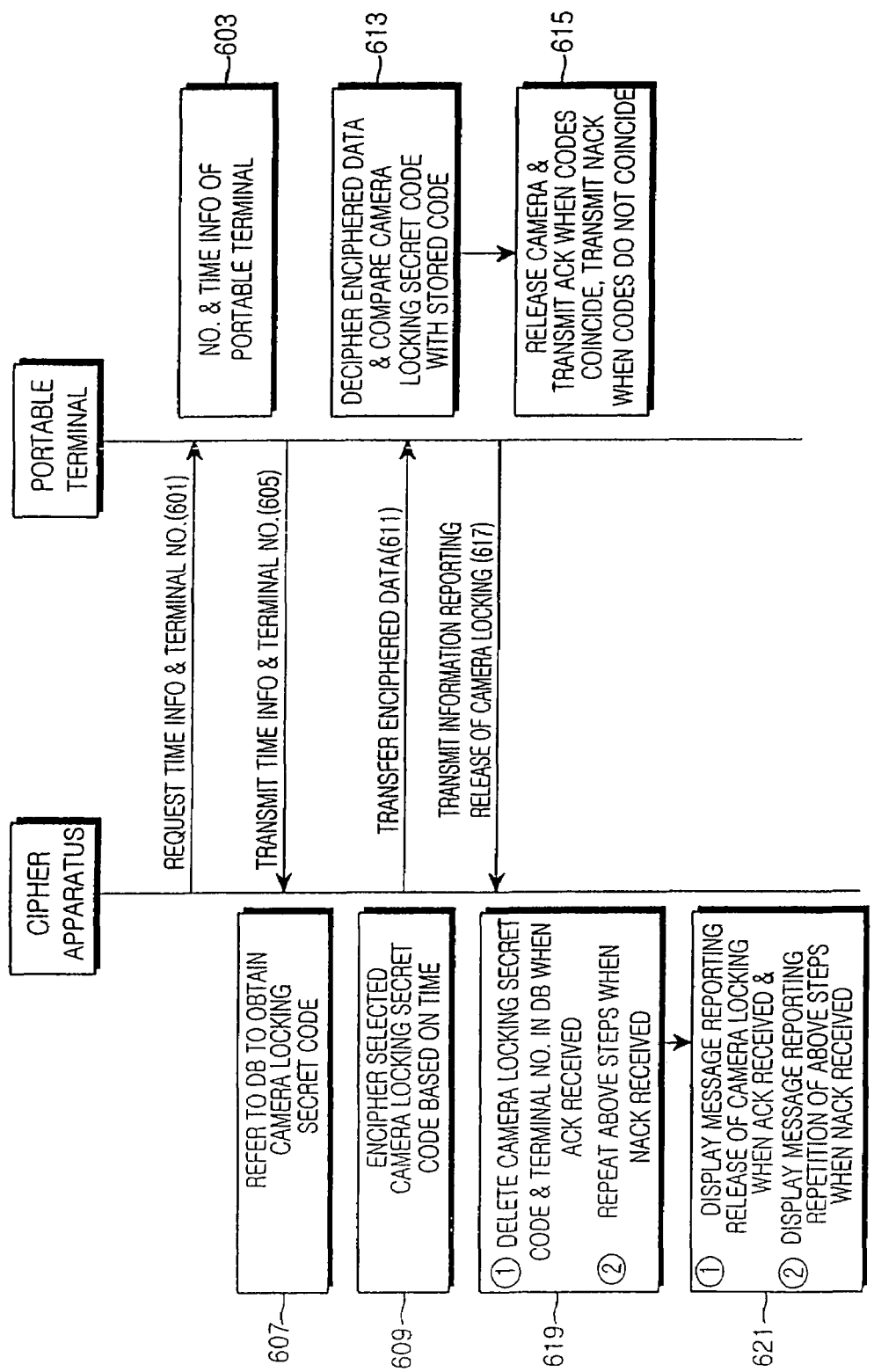
FIG. 6 is a flowchart illustrating an example of a process of releasing a camera in a portable terminal connected with a cipher apparatus according to the second embodiment of the present invention.

FIG. 6 is a flowchart illustrating an example of a process of releasing a camera in a portable terminal connected with a cipher apparatus according to the second embodiment of the present invention. With reference to FIGS. 1, 3, 4, and 6, a method of releasing the locking of a camera of a portable terminal will be described below.

When the cipher apparatus and the portable terminal are connected with each other through a USB cable, the cipher apparatus progresses to step 601. In step 601, the cipher apparatus requests time information and the portable terminal's phone number. The time information includes information of year, month, day, and time, stored in the portable terminal. In step 603, the control unit 110 reads its own number and time information from the memory 129. In step 605, the control unit 110 transmits the read number and time information to the cipher apparatus.

In step 607, the cipher apparatus refers to the database 411 by means of the received portable phone number to read the registered camera locking secret code. In step 609, the cipher apparatus enciphers the camera locking secret code registered in the database 411. In enciphering the code, the cipher apparatus utilizes the time information received from the portable terminal. In other words, the cipher apparatus performs the enciphering on the basis of the time information, for example, the cipher apparatus may convert the time information into a binary number and then add or multiply the binary number to or by a predetermined parameter. In step 611, the cipher apparatus transfers the data enciphered based on time to the portable terminal. The enciphered data includes the camera locking secret code.

In step 613, the control unit 110 deciphers the enciphered data and compares the camera locking secret code transmitted from the cipher apparatus with the camera locking secret code stored in the memory 129. In step 615, as a result of the comparison, the control unit 110 transfers information reporting the occurrence of a disparity between the secret codes to the cipher apparatus when the secret codes do not match, and releases the locking of the camera when the secret codes match. In releasing the locking of the camera, the control unit 110 deletes the camera locking secret code stored in the memory 129 and enables the operation of the image processor 170. When the image processor 170 can operate, the display unit 180 can display image data photographed by the camera 150 and the memory 129 can store the image data. Further, the control unit 110 transmits the information reporting the release of the locking of the camera to the cipher apparatus in step 617.

In step 619, when the information reporting the release of the locking of the camera is received from the portable terminal, the cipher apparatus deletes the camera locking secret code and the portable terminal number registered in the database 411. Here, the cipher apparatus displays a message reporting release of the locking of the camera, an example of which is shown in FIG. 3G. However, when the information reporting occurrence of a disparity between the secret codes is received from the portable terminal in step 621, the cipher apparatus repeats steps 601 to 619. Here, the cipher apparatus displays a message reporting the repetition of the above steps, an example of which is shown in FIG. 3H.

Figure 7:
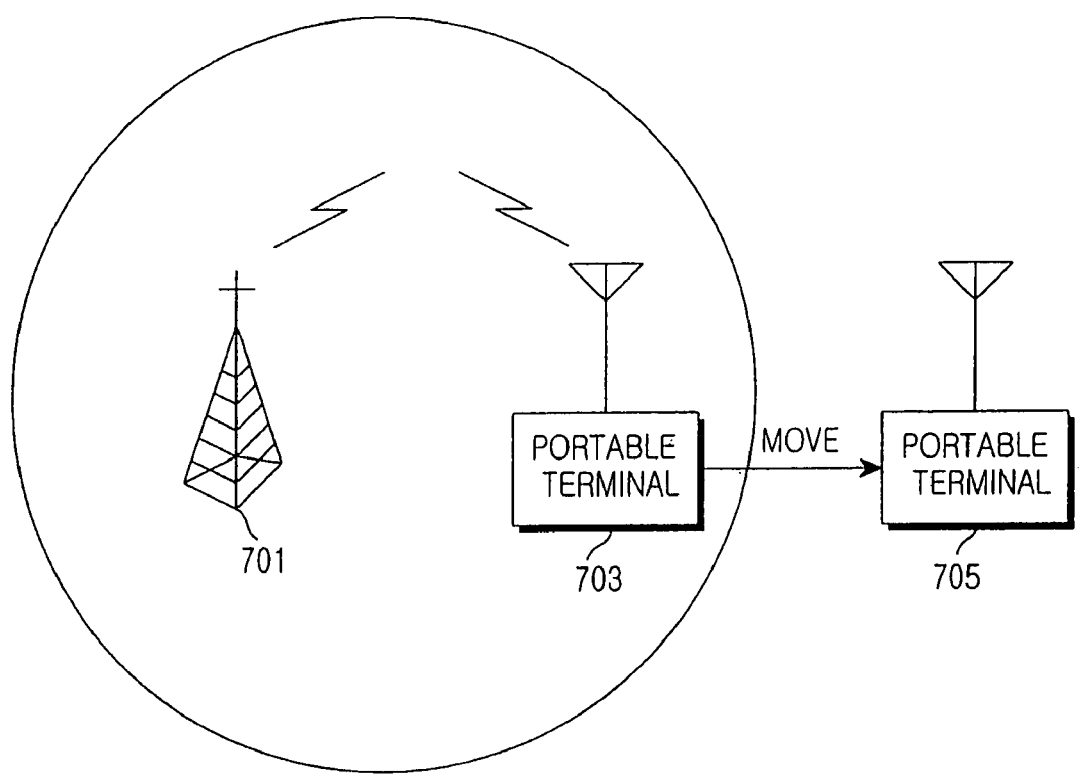
FIG. 7 is a diagram illustrating an example of a portable terminal located in a cell of a base station wherein both are operable according to a third embodiment of the present invention.
Figure 8:
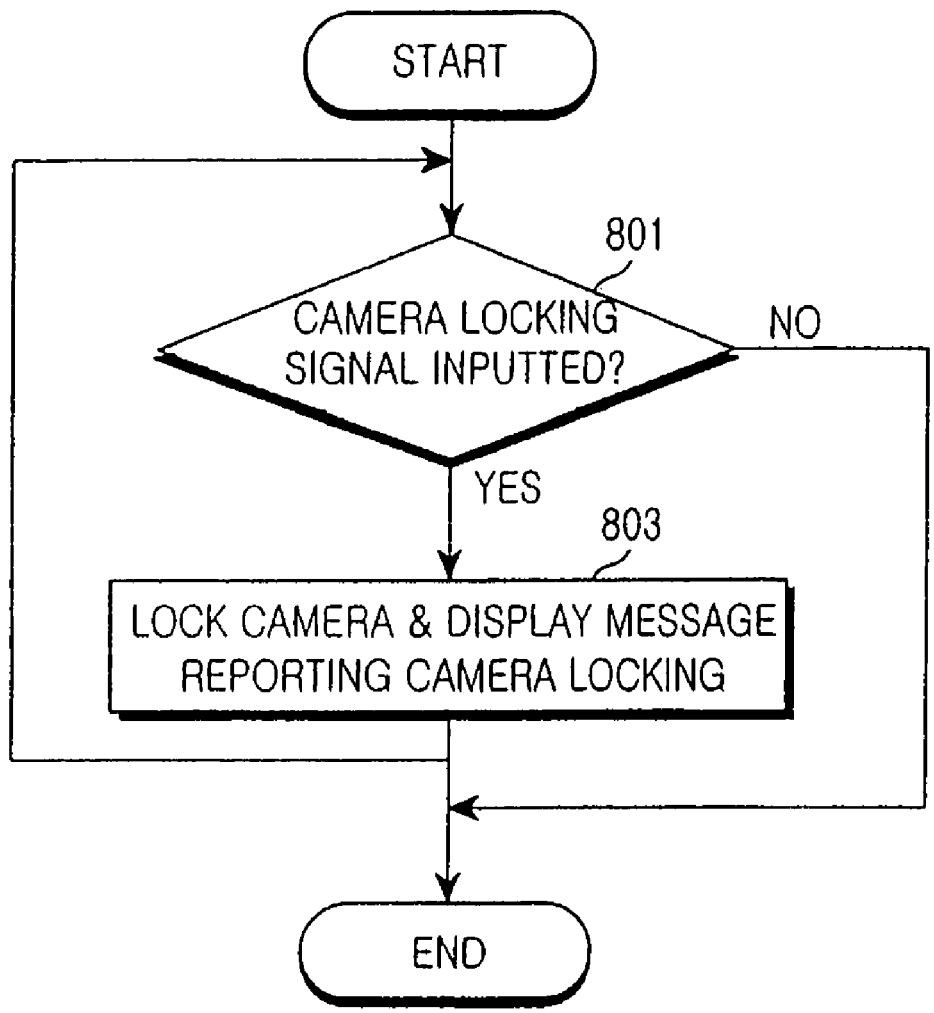
FIG. 8 is a flowchart illustrating an example of a method of locking and releasing a camera of a portable terminal located in a cell of a base station according to the third embodiment of the present invention.

FIG. 7 is a diagram illustrating an example of a method according to a third embodiment of the present invention, showing a portable terminal located in a cell of a base station. FIG. 8 is a flowchart illustrating an example of a method of locking and releasing a camera of a portable terminal located in a cell of a base station according to the third embodiment of the present invention. With reference to FIGS. 1, 3, 7, and 8, a method of locking and releasing a camera of a portable terminal located in a cell of a base station will be described below.

A base station 701 transmits a camera locking signal to a portable terminal 703 having a camera and located in a predetermined cell 702 of the base station 701. The base station 701 periodically transmits the camera locking signal at a predetermined time interval. The camera locking signal is a signal for preventing the camera of the portable terminal 703 from being operated, which is defined when the system is designed. The issue of defining the camera locking signal has no relation to the present invention, so description thereof is omitted here.

In step 801, the control unit 110 determines whether a camera locking signal is received from the base station 701. As a result of the determination, when a camera locking signal is not received by the portable terminal, the camera of the portable terminal can be used. However, when a camera locking signal is received, the control unit 110 proceeds to step 803 where the control unit 110 locks the camera and controls the display unit 180 to a message as shown in FIG. 3I. In locking the camera, the control unit 110 controls the operation of the image processor 170 to be stopped. Then, the display unit 180 cannot display image data and the memory 129 cannot store the image data.

For example, the base station 701 periodically transmits the camera locking signal at a constant time interval of one minute. The portable terminal 703 having received the camera locking signal stops the operation of the image processor 170 for said one minute. If the portable terminal 703 moves out of the predetermined cell 702 of the base station 701, a user of the portable terminal 703 can use the camera of the portable terminal 703.

As described above, the present invention can prevent a camera of a portable terminal from being used in a specific area, such as a building of a company or a factory, thereby protecting data requiring security, such as technological data, documents, equipment, etc., of a company, against unwanted divulgence.

While the invention has been shown and described with reference to certain embodiments thereof, it will be understood by those skilled in the art that various changes in form and details may be made therein without departing from the spirit and scope of the invention as defined by the appended claims.

Especially, although the above description deals with only the method of locking and releasing a camera of a portable terminal using BLUETOOTH or a base station, in an embodiment of the present invention, the invention can also be employed in the field of infrared data communication (IrDA).

What is claimed is:

1. A method for locking a camera in a portable terminal, the method comprising the steps of:
   (1) a cipher apparatus receiving information from the portable terminal, establishing a secret code, and transmitting data being enciphered comprising the secret code by using information of the portable terminal;
   (2) the portable terminal receiving the enciphered data and stopping an operation of the camera; and
   (3) the cipher apparatus receiving information reporting a locked state of the camera, and storing and displaying the secret code and a telephone number of the portable terminal.

2. The method as claimed in claim 1, wherein step (1) comprises the steps of:
   the cipher apparatus requesting time information and the telephone number of the portable terminal;
   the portable terminal transmitting the time information and the telephone number of the portable terminal;
   the cipher apparatus receiving the time information and the telephone number of the portable terminal, establishing the secret code, and enciphering the secret code by means of the time information; and
   the cipher apparatus transmitting enciphered data obtained from the secret code.

3. The method as claimed in claim 1, wherein step (2) comprises the steps of:
   storing the secret code in the memory of the portable terminal; and
   stopping an operation of the image processor.

4. The method as claimed in claim 1, wherein data are exchanged through a cable to lock the camera of the portable terminal.

5. The method as claimed in claim 1, wherein data are exchanged wirelessly, to lock the camera of the portable terminal.

* * * * *